US006397481B1

(12) United States Patent
Alvarez et al.

(10) Patent No.: US 6,397,481 B1
(45) Date of Patent: Jun. 4, 2002

(54) FIXTURES AND METHODS FOR INCREASING THE EFFICIENCY OF MANUFACTURING LINES

(75) Inventors: Luis M. Alvarez; Anthony J. May; Robert W. Vining, II, all of Shreveport, LA (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/491,874

(22) Filed: Jan. 27, 2000

(51) Int. Cl.[7] ........ B23Q 3/00

(52) U.S. Cl. ........ 33/1 M; 33/549; 269/56; 269/58

(58) Field of Search ........ 33/1 M, 549, 568, 33/569, 570, 573, DIG. 2; 269/55, 56, 58, 71

(56) References Cited

U.S. PATENT DOCUMENTS 2,676,414 A * 4/1954 Derry ........ 33/569
3,188,078 A * 6/1965 Peterson ........ 33/570
3,829,978 A * 8/1974 Basin et al. ........ 33/1 M
4,575,942 A * 3/1986 Moriyama ........ 33/568
5,377,419 A * 1/1995 Hesseltine ........ 33/549
5,816,568 A * 10/1998 Fox ........ 269/71

* cited by examiner

*Primary Examiner*—Christopher W. Fulton
(74) *Attorney, Agent, or Firm*—Troutman Sanders LLP

(57) ABSTRACT

A multi-purpose fixture can be used as a part of, or in conjunction with, a manufacturing line to make many different items, such as telephones or other types of communication equipment. A single, multi-purpose fixture can be used to make multiple items. When one item has completed a manufacturing process a different item can be inserted into the same fixture. The fixture is then adjusted to fit the new item. Because the fixture can be used with more than one item, changeover times are reduced as are the costs of developing separate fixtures for each item. Reductions in changeover times and costs allow a manufacturing line to operate more efficiently.

113 Claims, 6 Drawing Sheets

FIXTURES AND METHODS FOR INCREASING THE EFFICIENCY OF MANUFACTURING LINES

BACKGROUND OF THE INVENTION

Three factors which effect the overall efficiency of a manufacturing line are the costs involved in manufacturing a particular item, a related factor, namely, the speed at which an item can be manufactured and, finally, quality. In general, the lower the cost to manufacture an item the better chance there is to make a profit on that item. Similarly, the faster a manufacturing line can make an individual item the greater the number of items that line can make in a day, a week or a year. Low cost, high speed manufacturing lines which produce low quality items, however, are to be avoided. Quality cannot be sacrificed in exchange for lower costs and/or higher speeds. Together these three factors, cost, speed and quality, can be lumped together into a single idea; efficiency. The lower the cost, faster the line and higher the quality of item produced, the more efficient the line becomes.

It is difficult, however, to operate an efficient manufacturing line if that line is involved in the manufacture of different items. Once the line is done making a first item it may be necessary to change elements of the line to prepare it so that it can make a second item. For instance, a manufacturing line usually comprises a number of processes, tools and fixtures. A particular item or part of an item may be held in one fixture as the item/part undergoes multiple tests or is fed to different tools or processes along the manufacturing line. One tool may perform welding while the others perform cleaning, soldering or painting to name just a few examples. When the line finishes making the first item, its' fixture may need to be changed. A second, new fixture is designed to handle the second item. This process of changing fixtures may occur repeatedly as different items are made by the same manufacturing line.

Each time a fixture is changed the line must be halted temporarily to allow the first fixture to be replaced with the second one. The time it takes to change fixtures is referred to as the "changeover time". Time spent changing fixtures is time that cannot be spent making items. This lost time reduces the efficiency of the line. In addition to the time lost in changing fixtures, each fixture must be designed to hold a particular item. The design of the first fixture may not be the same as the second and vice-versa. Thus, money must be spent in designing and developing new fixtures, one fixture for each item, in order to make multiple items on a single manufacturing line.

It is believed that a single, multi-purpose fixture, which can be used to manufacture multiple items, would reduce changeover times and costs associated with the design and development of such fixtures without reducing quality. In short, it is believed that a multiple-purpose fixture will make a manufacturing line more efficient and more profitable.

Accordingly, it is an object of the present invention to provide for multi-purpose fixtures and methods which increase the efficiency of manufacturing lines.

It is another object of the present invention to provide for multi-purpose fixtures and methods capable of being used to manufacture multiple items.

Other objectives, features and advantages of the present invention will become apparent to those skilled in the art from the following detailed description of the invention taken in conjunction with the accompanying drawings and claims.

SUMMARY OF THE INVENTION

In accordance with the present invention there are provided multi-purpose fixtures and methods for increasing the efficiency of manufacturing lines. A fixture envisioned by the present invention comprises a movable frame, a rotatable table connected to the frame and two adjustable boundaries. Together the frame, table and boundaries are used to position an item, such as a telephone, substantially above a reference point. When the item is so positioned, tests may be made on the item being made or a tool or manufacturing process may be applied to the item being made. When a different item is to be manufactured, the frame, table and boundaries are adjusted to fit this item. There is no need to use a different fixture for each item to be manufactured.

Such a fixture can be used to design and develop items as well. A test fixture comprising a set of boundaries can be adapted to measure a sample item. The dimensions measured can then be sent to another fixture used in the manufacturing process.

The use of a fixture envisioned by the present invention reduces changeover times when different items are being made on the same manufacturing line.

The present invention and its advantages can be best understood with reference to the drawings, detailed description of the invention and claims that follow.

DETAILED DESCRIPTION OF THE INVENTION

Figure 1:
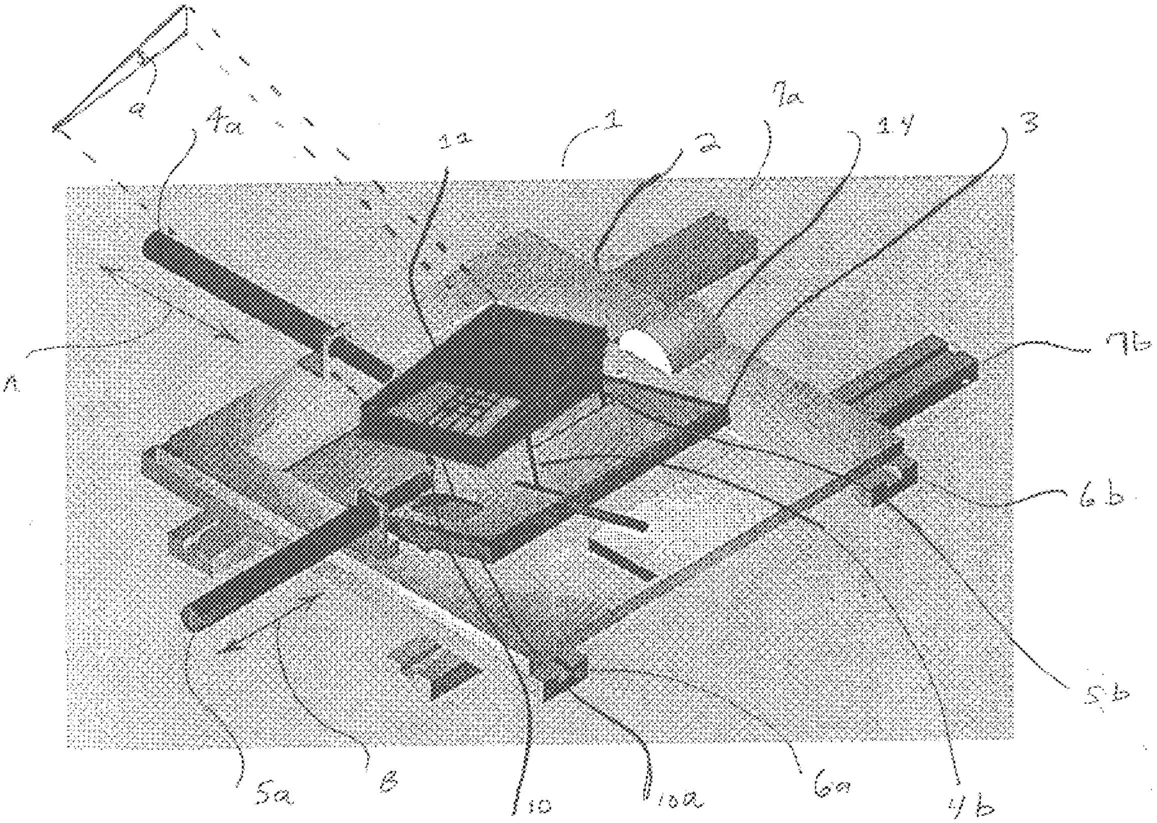
FIG. 1 depicts a multi-purpose fixture according to one embodiment of the present invention.

FIG. 1 shows an illustrative embodiment of a multi-purpose fixture 1 according to one embodiment of the present invention. As shown, the fixture 1 comprises movable frame or means 2, rotatable table or means 3, first adjustable boundary or means 4*a* and second adjustable boundary or means 5*a*. By way of example, the illustrative features and functions of these components are as follows. The rotatable table 3 is adapted so that it is connected to the frame 2. During the manufacture of an item 11, the table 3 is adapted to receive at least one tool or manufacturing process (hereafter collectively referred to as "tool") 10, such as a telephone plug and line cord assembly, at a reference point 10*a*. The table 3 is also adapted to rotate in order to vary the orientation of, or to position, the top surface of the item 11 on the table 3. The surface may need to be rotated in order to keep it in line with certain reference points related to the manufacturing process.

After the tool 10 is positioned substantially at the reference point 10*a* the first adjustable boundary 4*a* is adapted to substantially position the item 11, such as a telephone, with respect to the reference point 10*a* in first directions (i.e., back and forth) indicated by the arrow "A". Similarly, the second adjustable boundary 5*a* is adapted to substantially position the item 11 with respect to the reference point 10*a* in second directions indicated by the arrow "B". In this manner, the item 11 being manufactured is positioned to allow the tool 10 to be inserted into, or otherwise used to manufacture, the item 11. In an illustrative embodiment of the invention, a telephone plug and line cord assembly 10 is inserted into a telephone 11 to perform diagnostic and quality control tests of the telephone 11. The plug and line cord assembly 10 may be connected to a linear actuator, such as an air cylinder. Air pressure from the air cylinder provides the force to insert the plug into the telephone 11 once the telephone 11 has been positioned properly. Both the first and second adjustable boundaries 4*a*,5*a* are connected so as not to interfere with the rotation of the table 3. In one embodiment of the invention the boundaries 4*a*,5*a* are connected to the frame 2.

It should be understood that the position of the fixture 1 shown in FIG. 1 is only one of many positions envisioned by the present invention. FIG. 1 shows the frame 2 positioned in a horizontal plane and the table 3 rotating around a horizontal axis. In alternative embodiments of the present invention, the frame 2 may be positioned in a vertical plane or in a plane somewhere between the horizontal and vertical, i.e., positioned at some angle which is not perpendicular to the horizontal or vertical planes. In addition, though FIG. 1 shows a single item 11 on top of the tool 10, this need not be the case. These positions can be swapped or altered and more than one item may be positioned on the table 3 without effecting the fixtures, manufacturing lines or methods envisioned by the present invention.

In one embodiment, the fixture 1 is used as a part of a manufacturing line. This may require the fixture 1 to proceed through a number of steps or processes along a manufacturing line. In an illustrative embodiment of the invention the frame 2 is adapted to move parallel to the first direction "A", parallel to the second direction "B", or in another direction. To allow the fixture 1 to move along a manufacturing line, the fixture 1 may further comprise a first linear motor or means 6*a*,6*b* and second linear motor 7*a*,7*b* both of which are adapted to be connected to the frame 2. The first linear motor 6*a*,6*b* is adapted to move the frame 2 in first directions "A" while the second linear motor 7*a*,7*b* is adapted to move the frame 2 in second directions "B".

In an illustrative embodiment of the invention, the first and second linear motors 6*a*,6*b* and 7*a*,7*b* comprise rails. In addition, the linear motors each comprise a programmable motor adapted to move the frame 2 to a plurality of positions along the first and/or second directions, "A"/"B". In a further embodiment of the invention the programmable motors are adapted to move the frame 2 in the first and/or second directions using a plurality of speeds and/or accelerations. Said another way, the linear motors 6*a*,6*b* and 7*a*,7*b* comprise programmable, adjustable speed motors which are programmed to move the frame 2 to a plurality of positions using a plurality of speeds and/or accelerations.

Figure 2:
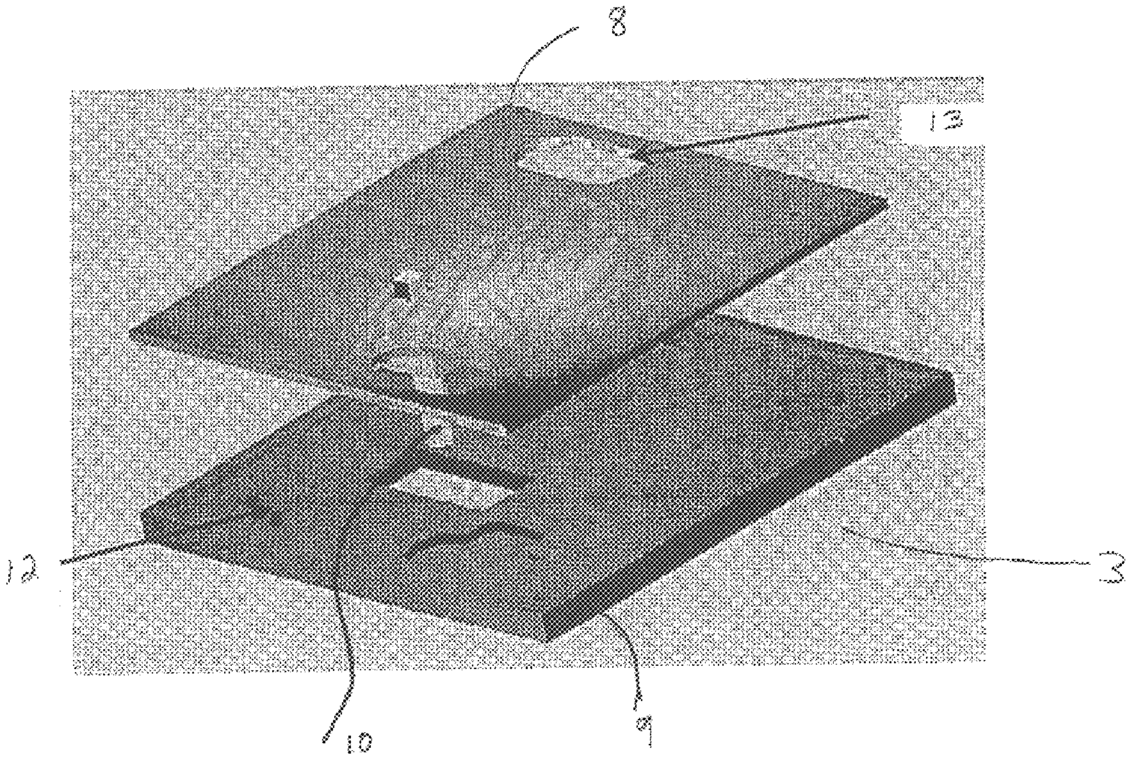
FIG. 2 depicts an expanded view of a rotatable table according to one embodiment of the present invention.

FIG. 2 shows an expanded view of the table 3. As shown, the table 3 comprises removable plate or means 8 and bottom or secured plate or means 9. In an illustrative embodiment of the invention, the removable plate 8 is custom designed for each item 11 (not shown). Said another way, each item which is going to be made using the fixture 1 may use a different plate 8. FIG. 2 also shows that the removable plate 8 is further adapted to be connected to the secured plate 9. In an illustrative embodiment of the invention, the secured plate 9 comprises dowel pins or means 12 for connecting the secured plate 9 to the removable plate 8. Though the dowel pins 12 are shown as a part of the secured plate 9 they may be a component of the removable plate 8 as well.

Figure 3:
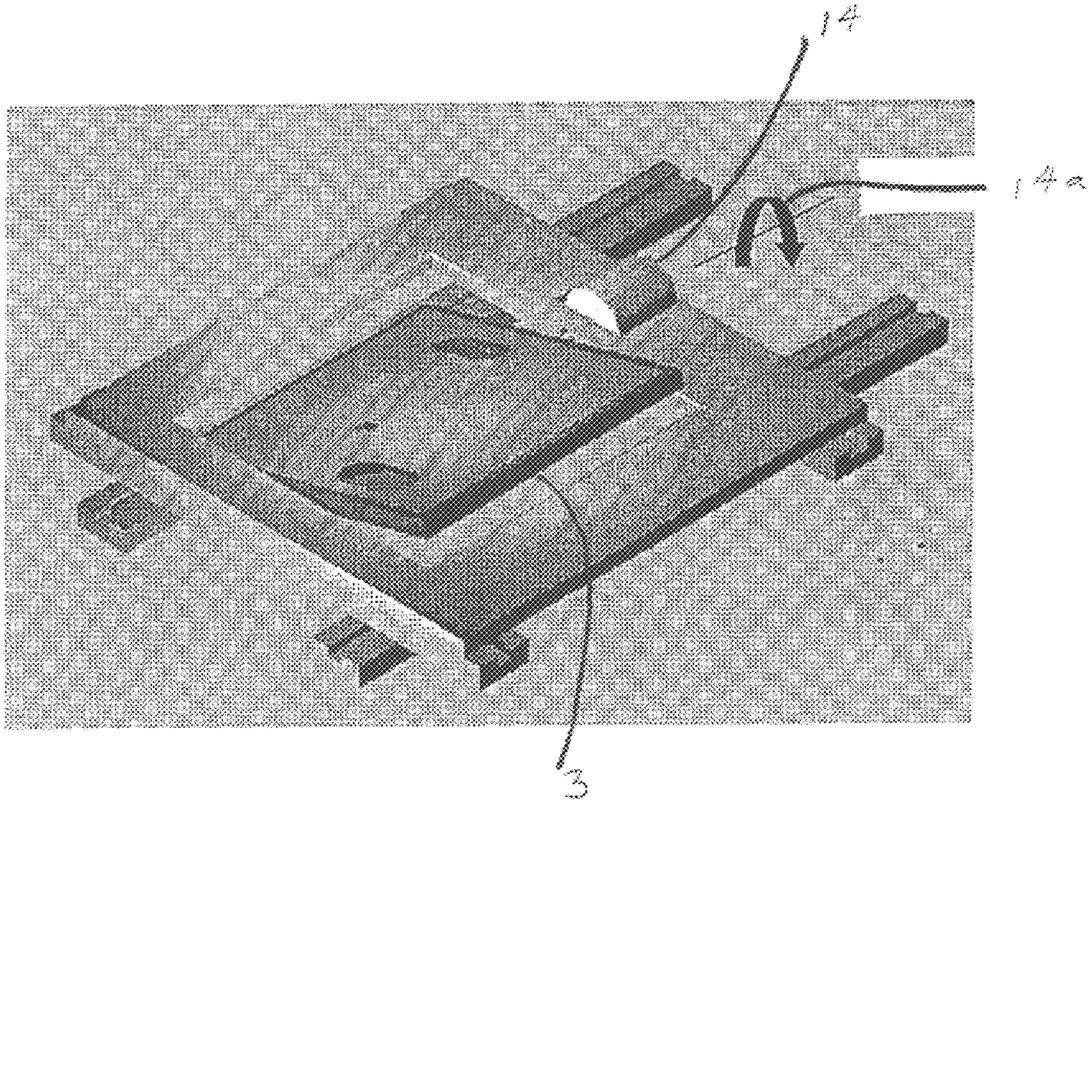
FIG. 3 depicts an axis of rotation of a rotatable table according to one embodiment of the present invention.

FIG. 3 shows rotary table motor or means 14. In an illustrative embodiment of the invention, the table motor 14 is adapted so that it is connected to the table 3 and is further adapted to rotate the table 3. The table 3 may be rotated at varying speeds to meet the needs of different items. To this end, the motor 14 may comprise a programmable, adjustable speed motor adapted to rotate the table 3 using a plurality of speeds. FIG. 3 also shows an axis of rotation, 14*a*. The rotary motor 14 may be farther adapted to rotate the table 3 using a plurality of speeds through a range of angles around the axis 14*a*. Though FIG. 3 depicts a clockwise direction of rotation, it should be understood that the present invention envisions embodiments where the motor 14 rotates the table 3 in a counterclockwise direction as well. In the illustrative embodiment of the invention shown in FIG. 3, the table 3 is shown rotating around one axis (e.g., the "x" axis), it should be understood that the table 3 may be rotated around other axes (e.g., "y" or "z") as well (or some portion of these axes).

The ability to rotate the table 3 through a wide range of angles around a number of axes helps insure that a large number of items 11 may be properly oriented. More specifically, there exists an angle "a" between the base of an item 11 and the top surface of the item (see FIG. 1). This angle varies item to item. Because of this variation, the table 3 must be adapted to rotate as just explained.

Figure 4:
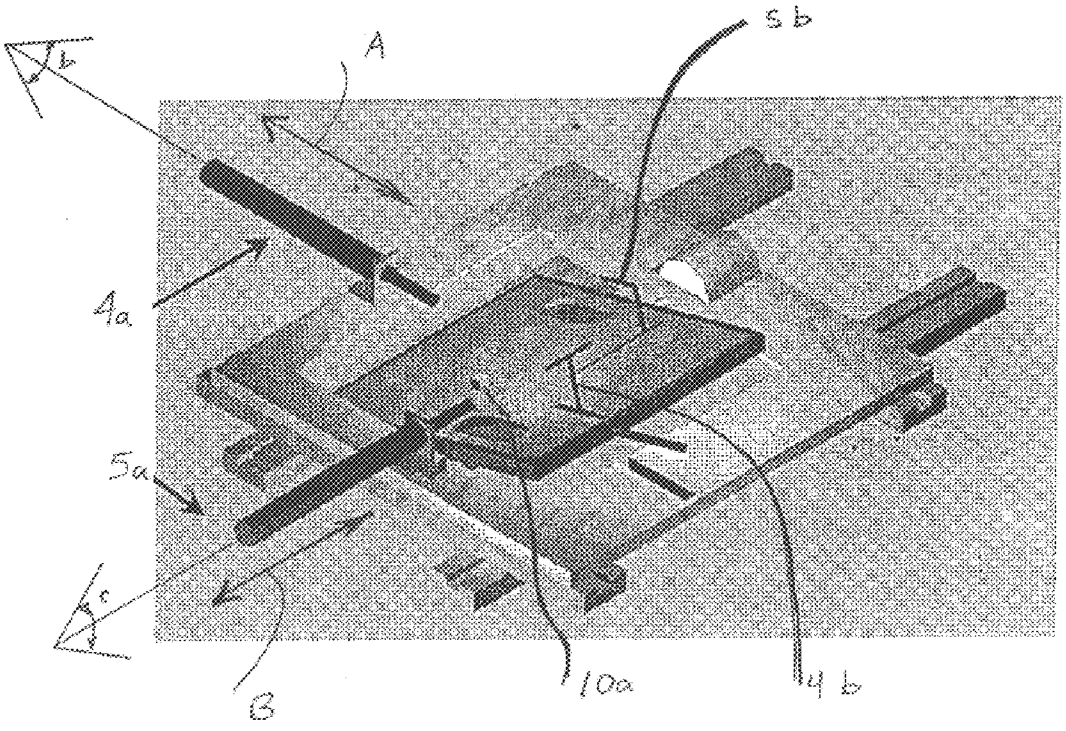
FIG. 4 depicts the operation of adjustable boundaries to position an item according to one embodiment of the present invention.

FIG. 4 depicts an example of how the first and second boundaries 4*a*,5*a* operate to position an item such that it is substantially positioned over the reference point 10*a* and tool 10. Backtracking somewhat, remember, a function of the boundaries 4*a*,5*a* is to position at least one item over at least one reference point 10*a* such that at least one tool may test the item or to allow the item to undergo a manufacturing process or the like. With this in mind, the boundaries 4*a*,5*a* comprise programmable boundaries, each adapted to apply a force to an item. In an illustrative embodiment of the invention, the first programmable boundary 4*a* is adapted to apply a force to an item in the first direction "A" while the second programmable boundary 5*a* is adapted to apply a force in the second direction "B". The exertion of these forces helps to position an item substantially over the reference point 10*a*. In an additional embodiment of the invention, the boundaries 4*a*,5*a* are further adapted to apply a variable force to an item. The power which generates the force to move the boundaries 4*a*,5*a* may be supplied by any number of means. In an illustrative embodiment of the invention, the boundaries 4*a*,5*a* comprise air-actuated valves which provide the force necessary to position an item.

In an alternative embodiment of the invention the boundaries 4*a*,5*a* are further adapted to position an item according to stored position information. This information may be stored as part of a separate memory unit or made part of a memory unit within each boundary 4*a*,5*a*. This information may take the form of bar codes or the like.

The boundaries 4*a*,5*a* exert forces on an item 11 so that the item is placed in contact with stops or means 4*b*,5*b*. The stops 4*b*,5*b* are adapted to position an item so that the sides of an item are positioned at an angle (e.g., perpendicular) to the boundaries 4*a*, 5*a*.

In an alternative embodiment of the invention the first stop 4*b* is further adapted to move in the first directions "A"

while the second stop 5*b* is adapted to move in the second directions “B”.

In an alternative embodiment of the invention, the stops 4*b*,5*b* help insure that the item 11 is not crooked or at an unwanted angle on the table 3.

Figure 5:
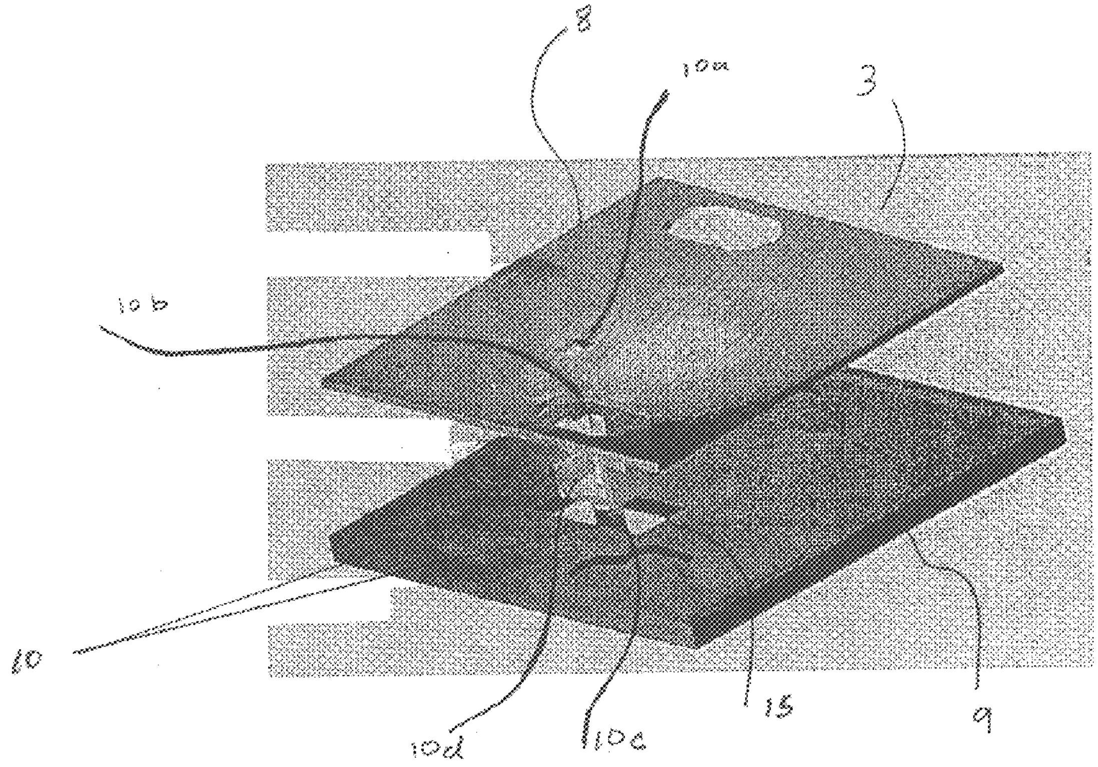
FIG. 5 depicts an expanded view of a rotatable table involved in a process related to the manufacture of an item according to one embodiment of the present invention.

FIG. 5 provides a close up view of an example of a process involved in the manufacture of an item. As shown, tool 10 is inserted through a cut-out or opening 15 in bottom plate 9. As indicated before, tool 10 may comprise a plug and line cord assembly. More specifically, the tool 10 may comprise a line cord and actuator 10*c*, bracket 10*d* and plug 10*b*. In one embodiment of the invention, the cord and actuator 10*c* deliver a force to the bracket 10*d*, which in turn forces the bracket 10*d* up against the bottom of the removable plate 8. This force also drives the plug 10*b* through a cut-out located at the reference point 10*a*. The plug 10*b* can then be inserted into an item, such as a telephone (not shown in FIG. 5), when the item is located at or above reference point 10*a*.

The process shown in FIG. 5 is only one of many processes which can be use in conjunction with fixture 1. Because each process may require working on a different part of an item, the cut-out 15 may need to be larger, smaller or located somewhere else along bottom plate 9. Though FIG. 5 depicts the surface area of the cut-out as being relatively small as compared to the solid surface area of the bottom plate 9, the invention is not so limited. In fact, in another embodiment of the invention, the surface area (i.e., cut-out opening) of the cut-out 15 is much larger than the solid surface area of the bottom plate 9. This allows the tool 10 to contact many different reference points 10*a* along removable plate 8, which in turn allows the tool 10 to contact many different parts of an item. It also allows more than one tool to come in contact with an item.

If the end of tool 10 comprises a plug 10*b*, the insertion of this plug 10*b* into an item may cause the item to move (e.g., upward). In an illustrative embodiment of the present invention, the boundaries 4*a*,5*a* and/or stops 4*b*,5*b* may be adapted to be positioned at an angle (e.g., see angles “b” and “c” on FIG. 4) to prevent the item from moving.

Because the fixture 1 comprises adjustable boundaries 4*a*,5*a* and rotatable table 3 the fixture 1 may be used to hold many different items. The fixture 1 is adapted to receive a new item to be manufactured by adjusting at least boundaries 4*a*,5*a* and table 3 (e.g., changing removable plates). This reduces changeover times. It can be said, then, that the table and boundaries comprise a multi-purpose fixture adapted to reduce changeover times. Reductions in changeover times help to increase the efficiency of a manufacturing line.

Up until now the discussion has centered on the use of a multi-purpose fixture to manufacture items. The invention, however, is not so limited. The fixture can also be used in the design and development of items as well. In alternative embodiments of the invention, the boundaries and stops may be adapted to measure dimensions of a sample, test or reference item. For example, the first boundary and stop may be adapted to measure a first dimension (e.g., length) while the second boundary and stop may be adapted to measure a second dimension (e.g., width). Other than the added ability to measure dimensions the boundaries and stops function in a similar manner as described above. An example of how a multi-purpose fixture can be used in the development of an item is as follows.

Figure 6:
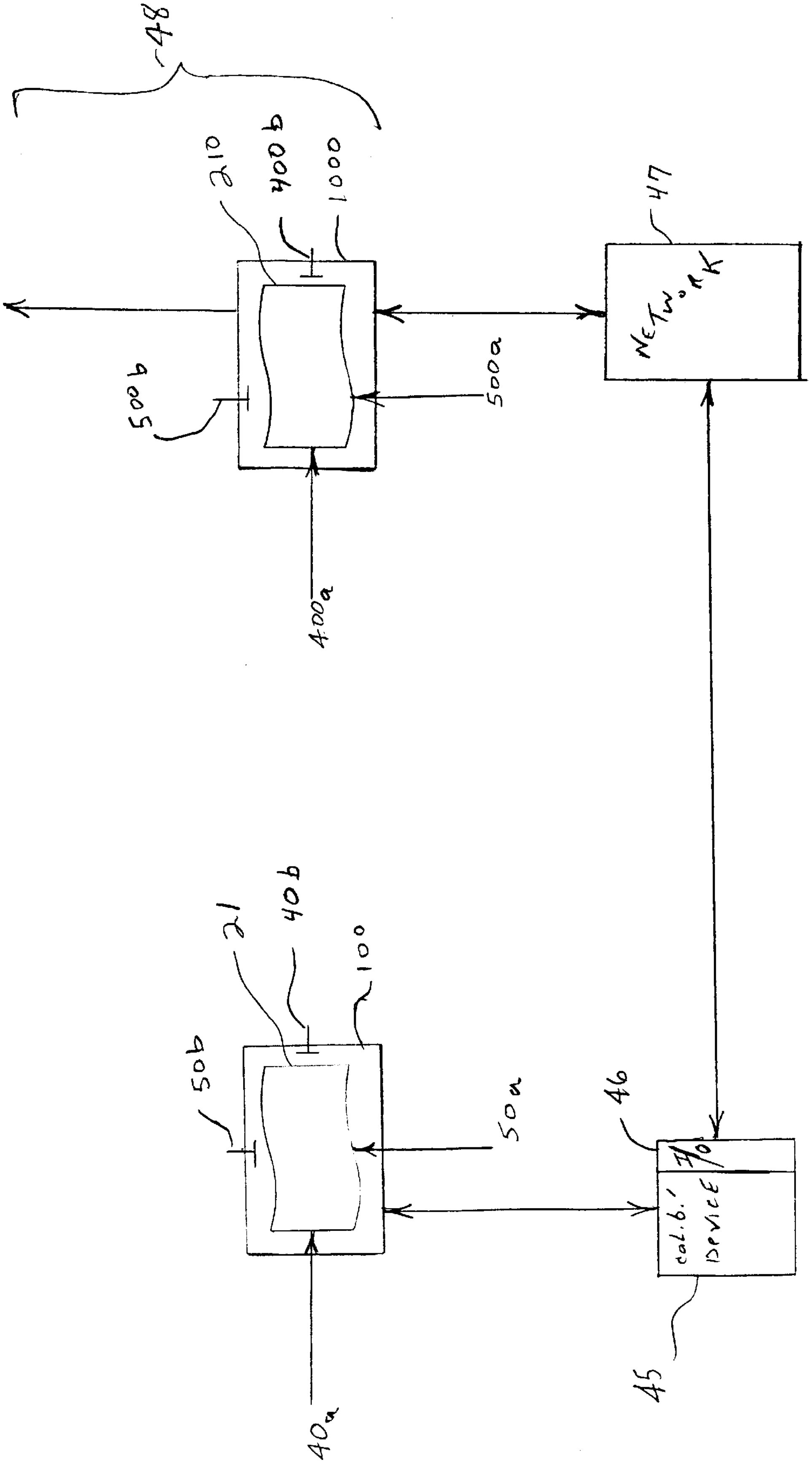
FIG. 6 depicts a block diagram showing how a multi-purpose test fixture can be connected to a multi-purpose manufacturing fixture according to one embodiment of the present invention.

Referring to FIG. 6, a sample item 21 may be inserted into a multi-purpose, test or development fixture 100. Boundaries 40*a*,50*a* and stops 40*b*,50*b* can be adapted to apply forces against the item 21 in order the position the item 21. The boundaries 40*a*,50*a* can be adapted to be connected to calibrated measurement device or means 45. In one embodiment of the present invention, the calibrated device 45 comprises a storage device adapted to store the dimensions measured by the movement of the boundaries 40*a*,50*a*. Once the dimensions are stored, this information can be output to at least one multi-purpose fixture 1000 located along a manufacturing line 48. In one example, the device 45 may comprise a network input/output (“I/O”) device 46 adapted to output the stored dimensions to a network 47. The network 47 in turn is connected to the manufacturing line 48 comprising the at least one fixture 1000. In this manner, the dimensions measured by the test fixture 100 can be sent to the fixture 1000 in order to use those dimensions to help manufacture an item 210 on manufacturing line 48. Though shown as separate from the manufacturing line 48 in FIG. 6, it should be understood that the test fixture 100 may be a part of the line 48 as well. It should also be understood that the connection of the test fixture 100 to the fixture 1000 shown in FIG. 6 is only one example of how sample measurements may be sent between the fixtures 100,1000.

Though the discussion above has centered on fixtures and manufacturing lines the present invention also envisions complimentary methods for carrying out the features and functions of the present invention as well.

It is to be understood that changes and variations may be made without departing from the spirit and scope of this invention as defined by the claims that follow.

We claim:

1. A multi-purpose fixture comprising:

a movable frame;

a rotatable table adapted to connect to the frame and further adapted to receive at least one tool at an at least one reference point and to vary an orientation of at least one item placed on the table with respect to the reference point;

a first adjustable boundary adapted to connect to the frame and further adapted to substantially position the item with respect to the reference point in a first direction; and a second adjustable boundary adapted to connect to the frame and further adapted to substantially position the item with respect to the reference point in a second direction.

2. The fixture as in claim 1 wherein the frame is adapted to move parallel to the first and second directions.

3. The fixture as in claim 1 further comprising a first linear motor adapted to connect to the frame and further adapted to move the frame in the first direction.

4. The fixture as in claim 3 wherein the first linear motor comprises a programmable motor.

5. The fixture as in claim 4 wherein the programmable motor is adapted to move the frame in the first direction using a plurality of speeds.

6. The fixture as in claim 1 further comprising a second linear motor adapted to connect to the frame and further adapted to move the frame in the second direction.

7. The fixture as in claim 6 wherein the second linear motor comprises a programmable motor.

8. The fixture as in claim 7 wherein the programmable motor is adapted to move the frame in the second direction using a plurality of speeds.

9. The fixture as in claim 1 wherein the table comprises a removable plate.

10. The fixture as in claim 1 wherein the at least one tool comprises at least one plug and line cord assembly.

11. The fixture as in claim 1 wherein the item comprises a telephone.

12. The fixture as in claim 1 further comprising a rotary table motor adapted to connect to the table and further adapted to rotate the table.

13. The fixture as in claim 12 wherein the rotary table motor comprises a programmable motor.

14. The fixture as in claim 13 wherein the programmable motor is adapted to rotate the table using a plurality of speeds.

15. The fixture as in claim 14 wherein the programmable motor is further adapted to rotate the table using the plurality of speeds through a plurality of angles.

16. The fixture as in claim 1 wherein the first adjustable boundary is adapted to be positioned at an angle.

17. The fixture as in claim 1 wherein the first adjustable boundary is adapted to apply a force to the item to position the item.

18. The fixture as in claim 17 wherein the first adjustable boundary is further adapted to apply a variable force to the item.

19. The fixture as in claim 1 wherein the first adjustable boundary comprises an air-actuated valve.

20. The fixture as in claim 1 wherein the second adjustable boundary is adapted to be positioned at an angle.

21. The fixture as in claim 1 wherein the second adjustable boundary is adapted to apply a force to the item to position the item.

22. The fixture as in claim 21 wherein the second adjustable boundary is further adapted to apply a variable force to the item.

23. The fixture as in claim 1 wherein the second adjustable boundary comprises an air-actuated valve.

24. The fixture as in claim 1 wherein the first and second adjustable boundaries are adapted to position the item according to stored position information.

25. The fixture as in claim 24 wherein the position information comprises bar codes.

26. The fixture as in claim 1 wherein the frame, table and boundaries are adapted to reduce a changeover time.

27. The fixture as in claim 1 further comprising first and second stops adapted to position sides of the item at an angle to the first and second boundaries.

28. The fixture as in claim 27 wherein the angle comprises a perpendicular angle.

29. The fixture as in claim 27 wherein the first stop is adapted to move in first directions and the second stop is adapted to move in second directions.

30. A manufacturing line comprising at least one multi-purpose fixture, the fixture comprising:

a movable frame;

a rotatable table adapted to connect to the frame and further adapted to receive at least one tool at an at least one reference point and to vary an orientation of at least one item placed on the table with respect to the reference point;

a first adjustable boundary adapted to connect to the frame and further adapted to substantially position the item with respect to the reference point in a first direction; and a second adjustable boundary adapted to connect to the frame and further adapted to substantially position the item with respect to the reference point in a second direction.

31. The manufacturing line as in claim 30 wherein the frame is adapted to move parallel to the first and second directions.

32. The manufacturing line as in claim 30 further comprising a first linear motor adapted to connect to the frame and further adapted to move the frame in the first direction.

33. The manufacturing line as in claim 32 wherein the first linear motor comprises a programmable motor.

34. The manufacturing line as in claim 33 wherein the programmable motor is adapted to move the frame in the first direction using a plurality of speeds.

35. The manufacturing line as in claim 30 further comprising a second linear motor adapted to connect to the frame and further adapted to move the frame in the second direction.

36. The manufacturing line as in claim 35 wherein the second linear motor comprises a programmable motor.

37. The manufacturing line as in claim 36 wherein the programmable motor is adapted to move the frame in the second direction using a plurality of speeds.

38. The manufacturing line as in claim 30 wherein the table comprises a removable plate.

39. The manufacturing line as in claim 30 wherein the at least one tool comprises at least one plug and line cord assembly.

40. The manufacturing line as in claim 30 wherein the item comprises a telephone.

41. The manufacturing line as in claim 30 further comprising a rotary table motor adapted to connect to the table and further adapted to rotate the table.

42. The manufacturing line as in claim 41 wherein the rotary table motor comprises a programmable motor.

43. The manufacturing line as in claim 42 wherein the programmable motor is adapted to rotate the table using a plurality of speeds.

44. The manufacturing line as in claim 43 wherein the programmable motor is further adapted to rotate the table using the plurality of speeds through a plurality of angles.

45. The manufacturing line as in claim 30 wherein the first adjustable boundary is adapted to be positioned at an angle.

46. The manufacturing line as in claim 30 wherein the first adjustable boundary is adapted to apply a force to the item to position the item.

47. The manufacturing line as in claim 46 wherein the first adjustable boundary is further adapted to apply a variable force to the item.

48. The manufacturing line as in claim 30 wherein the first adjustable boundary comprises an air-actuated valve.

49. The manufacturing line as in claim 30 wherein the second adjustable boundary is adapted to be positioned at an angle.

50. The manufacturing line as in claim 30 wherein the second adjustable boundary is adapted to apply a force to the item to position the item.

51. The manufacturing line as in claim 50 wherein the second adjustable boundary is further adapted to apply a variable force to the item.

52. The manufacturing line as in claim 30 wherein the second adjustable boundary comprises an air-actuated valve.

53. The manufacturing line as in claim 30 wherein the first and second adjustable boundaries are adapted to position the item according to stored position information.

54. The manufacturing line as in claim 53 wherein the position information comprises bar codes.

55. The manufacturing line as in claim 30 wherein the frame, table and boundaries are adapted to reduce a changeover time.

56. The manufacturing line as in claim 30 further comprising first and second stops adapted to position sides of the item at an angle to the first and second boundaries.

57. The manufacturing line as in claim 56 wherein the angle comprises a perpendicular angle.

58. The manufacturing line as in claim 56 wherein the first stop is adapted to move in first directions and the second stop is adapted to move in second directions.

59. a multi-purpose, development fixture comprising:

a first adjustable boundary adapted to measure a first dimension of an item;

a second adjustable boundary adapted to measure a second dimension of an item; and a rotatable table adapted position the item at a rotatable angle from the adjustable boundaries.

60. The fixture as in claim 59 further comprising a storage device adapted to store dimensions of the item.

61. The fixture as in claim 60 further comprising a network I/O device adapted to output the stored dimensions to at least one manufacturing fixture.

62. The fixture as in claim 59 further comprising first and second stops adapted to position sides of the item at an angle to the first and second boundaries.

63. The fixture as in claim 62 wherein the angle comprises a perpendicular angle.

64. The fixture as in claim 62 wherein the first stop is adapted to move in first directions and the second stop is adapted to move in second directions.

65. The fixture as in claim 59 wherein at least one of the adjustable boundaries is adapted to apply a force to the item to position the item.

66. The fixture as in claim 59 wherein at least one of the adjustable boundaries comprises an air-actuated valve.

67. a multi-purpose, development fixture comprising:

a first adjustable boundary adapted to measure a first dimension of an item; and a second adjustable boundary adapted to measure a second dimension of an item; and a rotatable table adapted position the item at a rotatable angle from the adjustable boundaries.

68. The manufacturing line as in claim 67 further comprising a storage device adapted to store dimensions of the item.

69. The manufacturing line as in claim 68 further comprising a network I/O device adapted to output the stored dimensions to at least one manufacturing fixture.

70. The manufacturing line as in claim 67 further comprising first and second stops adapted to position sides of the item at an angle to the first and second boundaries.

71. The manufacturing line as in claim 70 wherein the angle comprises a perpendicular angle.

72. The manufacturing line as in claim 70 wherein the first stop is adapted to move in first directions and the second stop is adapted to move in second directions.

73. The manufacturing line as in claim 67 wherein at least one of the adjustable boundaries is adapted to apply a force to the item to position the item.

74. The manufacturing line as in claim 67 wherein at least one of the adjustable boundaries comprises an air-actuated valve.

75. A method for increasing the efficiency of a manufacturing line comprising:

moving a frame;

rotating a table adapted to connect to the frame to receive at least one tool at an at least one reference point along the table and to vary an orientation of at least one item placed on the table with respect to the reference point;

adjusting a first boundary adapted to connect to the frame to substantially position the item with respect to the reference point in a first direction; and adjusting a second boundary adapted to connect to the frame to substantially position the item with respect to the reference point in a second direction.

76. The method as in claim 75 further comprising moving the frame parallel to the first and second directions.

77. The method as in claim 75 further comprising moving the frame in the first direction using a plurality of speeds.

78. The method as in claim 75 further comprising moving the frame in the second direction using a plurality of speeds.

79. The method as in claim 75 wherein the at least one tool comprises at least one plug and line cord assembly.

80. The method as in claim 75 wherein the item comprises a telephone.

81. The method as in claim 75 further comprising rotating the table using a plurality of speeds.

82. The method as in claim 81 further comprising rotating the table using the plurality of speeds through a plurality of angles.

83. The method as in claim 75 further comprising positioning the first boundary at an angle.

84. The method as in claim 83 further comprising applying a force to the item to position the item.

85. The method as in claim 84 further comprising applying a variable force to the item.

86. The method as in claim 75 wherein the first boundary comprises an air-actuated valve.

87. The method as in claim 75 further comprising positioning the second boundary at an angle.

88. The method as in claim 87 further comprising applying a force to the item to position the item.

89. The method as in claim 88 further comprising applying a variable force to the item.

90. The method as in claim 75 wherein the second boundary comprises an air-actuated valve.

91. The method as in claim 75 further comprising positioning the item in both directions according to stored position information.

92. The method as in claim 75 wherein the movement of the frame, rotation of the table and adjustment of the boundaries reduce a changeover time.

93. A method of positioning an item comprising:

moving a frame;

rotating a table adapted to connect to the frame to receive at least one tool at an at least one reference point along the table and to vary an orientation of at least one item placed on the table with respect to the reference point;

adjusting a first boundary adapted to connect to the frame to substantially position an item with respect to the reference point in a first direction; and adjusting a second boundary adapted to connect to the frame to substantially position the item with respect to the reference point in a second direction.

94. The method as in claim 93 further comprising moving the frame parallel to the first and second directions.

95. The method as in claim 93 further comprising moving the frame in the first direction using a plurality of speeds.

96. The method as in claim 93 further comprising moving the frame in the second direction using a plurality of speeds.

97. The method as in claim 93 wherein the at least one tool comprises at least one plug and line cord assembly.

98. The method as in claim 93 wherein the item comprises a telephone.

99. The method as in claim 93 further comprising rotating the table using a plurality of speeds.

100. The method as in claim 99 further comprising rotating the table using the plurality of speeds through a plurality of angles.

101. The method as in claim 93 further comprising positioning the first boundary at an angle.

102. The method as in claim 101 further comprising applying a force to the item to position the item.

103. The method as in claim 102 further comprising applying a variable force to the item.

104. The method as in claim 93 wherein the first boundary comprises an air-actuated valve.

105. The method as in claim 93 further comprising positioning the second adjustable boundary at an angle.

106. The method as in claim 105 further comprising applying a force to the item to position the item.

107. The method as in claim 106 further comprising applying a variable force to the item.

108. The method as in claim 93 wherein the second adjustable boundary comprises an air-actuated valve.

109. The method as in claim 93 further comprising positioning the item in both directions according to stored position information.

110. The method as in claim 93 wherein the movement of the frame, rotation of the table and adjustment of the boundaries reduce a changeover time.

111. A method of increasing the efficiency of a manufacturing line using a multi-purpose, development fixture comprising;

rotating an item;

measuring a first, dimension of the; and measuring a second dimension of the item.

112. The method as in claim 111 further comprising storing dimensional information of the item.

113. The method as in claim 112 further comprising outputting the stored dimensional information to at least one manufacturing fixture.

* * * * *